United States Patent
Jonsson et al.

(10) Patent No.: US 12,548,263 B1
(45) Date of Patent: Feb. 10, 2026

(54) AUGMENTATION BASED ON PHYSICAL ENVIRONMENT CONTEXT

(71) Applicant: Apple Inc., Cupertino, CA (US)

(72) Inventors: Lilli I. Jonsson, Saratoga, CA (US); Mikaela D. Estep, Sunnyvale, CA (US); Paul Ewers, San Francisco, CA (US); Theodore Nestor Panagiotopoulos, San Jose, CA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 17/411,696

(22) Filed: Aug. 25, 2021

Related U.S. Application Data

(60) Provisional application No. 63/073,489, filed on Sep. 2, 2020.

(51) Int. Cl.
| | | |
|---|---|---|
| *G06T 19/00* | (2011.01) | |
| *G06T 7/73* | (2017.01) | |
| *G06V 20/10* | (2022.01) | |

(52) U.S. Cl.
CPC .............. *G06T 19/006* (2013.01); *G06T 7/73* (2017.01); *G06V 20/10* (2022.01); *G06T 2207/30204* (2013.01)

(58) Field of Classification Search
CPC ...................... G06T 19/006; G06T 7/73; G06T 2207/30204; G06V 20/10
See application file for complete search history.

(56) References Cited

U.S. PATENT DOCUMENTS

| | | | |
|---|---|---|---|
| 10,837,788 B1 * | 11/2020 | Kentley-Klay | .... G01C 21/3438 |
| 11,126,845 B1 * | 9/2021 | Chaturvedi | ........ H04N 5/23218 |
| 2012/0293548 A1 * | 11/2012 | Perez | ...................... G06F 3/012 |
| | | | 345/633 |
| 2015/0262428 A1 | 9/2015 | Tatzgern et al. | |
| 2016/0378861 A1 * | 12/2016 | Eledath | ................. G06T 19/006 |
| | | | 707/766 |
| 2017/0169611 A1 | 6/2017 | Ramirez Flores et al. | |
| 2017/0337742 A1 * | 11/2017 | Powderly | .............. G06F 3/0482 |
| 2018/0012411 A1 | 1/2018 | Richey et al. | |
| 2019/0094981 A1 * | 3/2019 | Bradski | ................ H04N 21/414 |

(Continued)

OTHER PUBLICATIONS

Grubert, J., Langlotz, T., Zollmann, S., & Regenbrecht, H. (2016). Towards pervasive augmented reality: Context-awareness in augmented reality. IEEE transactions on visualization and computer graphics, 23(6), 1706-1724.*

(Continued)

*Primary Examiner* — Sarah Lhymn
(74) *Attorney, Agent, or Firm* — Thompson Hine LLP

(57) ABSTRACT

Various implementations disclosed herein include devices, systems, and methods that filter notifications and other augmentations based on the context of the physical environment for which the augmentations are provided. In addition to context, the filtering may be determined based on user input, for example, based on a user turning a dial or providing input identifying the user's current interest. The filtering may be determined based on user attributes, for example, based on the user's calendar schedule, the user's mood, the user's speed of movement, etc. The filtering may be based on the user's current activity (e.g. exercising) or state (e.g., rushed), and/or user prior responses to augmentations.

24 Claims, 5 Drawing Sheets

(56) References Cited

U.S. PATENT DOCUMENTS

2019/0325498 A1* 10/2019 Clark ................ G06Q 30/0625
2020/0065587 A1   2/2020 Hoover et al.

OTHER PUBLICATIONS

Hugues, O., Fuchs, P., & Nannipieri, O. (2011). New augmented reality taxonomy: Technologies and features of augmented environment. In Handbook of augmented reality (pp. 47-63). Springer, New York, NY.*

* cited by examiner

AUGMENTATION BASED ON PHYSICAL ENVIRONMENT CONTEXT

CROSS-REFERENCE TO RELATED APPLICATIONS

This application claims the benefit of U.S. Provisional Application Ser. No. 63/073,489 filed Sep. 2, 2020, which is incorporated herein in its entirety.

TECHNICAL FIELD

The present disclosure generally relates to electronic devices that capture images and other sensor information of physical environments and provide visual and audio content.

BACKGROUND

Electronic devices may provide views of a physical environment proximate the electronic device along with additional visual and audio content. For example, a view displayed on an electronic device may include pass-through images of the surrounding physical environment overlain with notifications or other augmentations that provide information associated with objects in the physical environment.

SUMMARY

It is desirable to enable improved user content experiences. Various implementations disclosed herein include devices, systems, and methods that filter notifications and other augmentations based on the context of the physical environment for which the augmentations are provided.

In general, one innovative aspect of the subject matter described in this specification can be embodied in methods that obtain sensor data corresponding to a physical environment, for example, in the form of image, sound, and/or depth data. The methods may include determining a context of the physical environment based on the sensor data. For example, this may involve using machine learning to classify the physical environment as one of multiple classifications. The context may include the type of environment, whether the environment is visually noisy, whether the environment is audibly noisy, the lighting of the environment, the number of people in the environment, the identities of people in the environment, the rate of change of objects in the environment, the number of people nearby, the day of the week, the date, the time of day, a safety level of the environment, and/or whether the environment is of a type that requires few or no distractions due to safety considerations.

The methods may involve filtering augmentations to augment the physical environment based on the determined context. For example, the filtering may reduce the number of augmentations, reduce the amount of content within the augmentations, change the way the augmentations are provided (e.g., changing size, color, opacity, brightness, length of display, and/or display format. The filtering may select a subset of augmentations based on content, type, and/or location of the augmentations given the context. For example, if the user is currently focused on sports-related items, only sports-related augmentations may be displayed. In some implementations, the filtering is based on a determined augmentation level, e.g., 1-10, which may be determined based on the context of the physical environment. The filtering may be determined based on user input, for example, based on a user turning a dial or providing input identifying the user's current interest. The filtering may be determined based on user attributes, for example, based on the user's calendar schedule, the user's mood, the user's speed of movement, etc. The filtering may be based on the user's current activity (e.g. exercising) or state (e.g., rushed), and/or user prior responses to augmentations.

The methods may involve presenting a three-dimensional (3D) view of the physical environment augmented with the filtered augmentations. As the user experience via the electronic device continues, the context may change and the augmentations may be changed accordingly. For example, as the lunch crowd leaves the environment and the environment changes from crowded to sparse, the number of augmentations that are selected for display may be increased.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
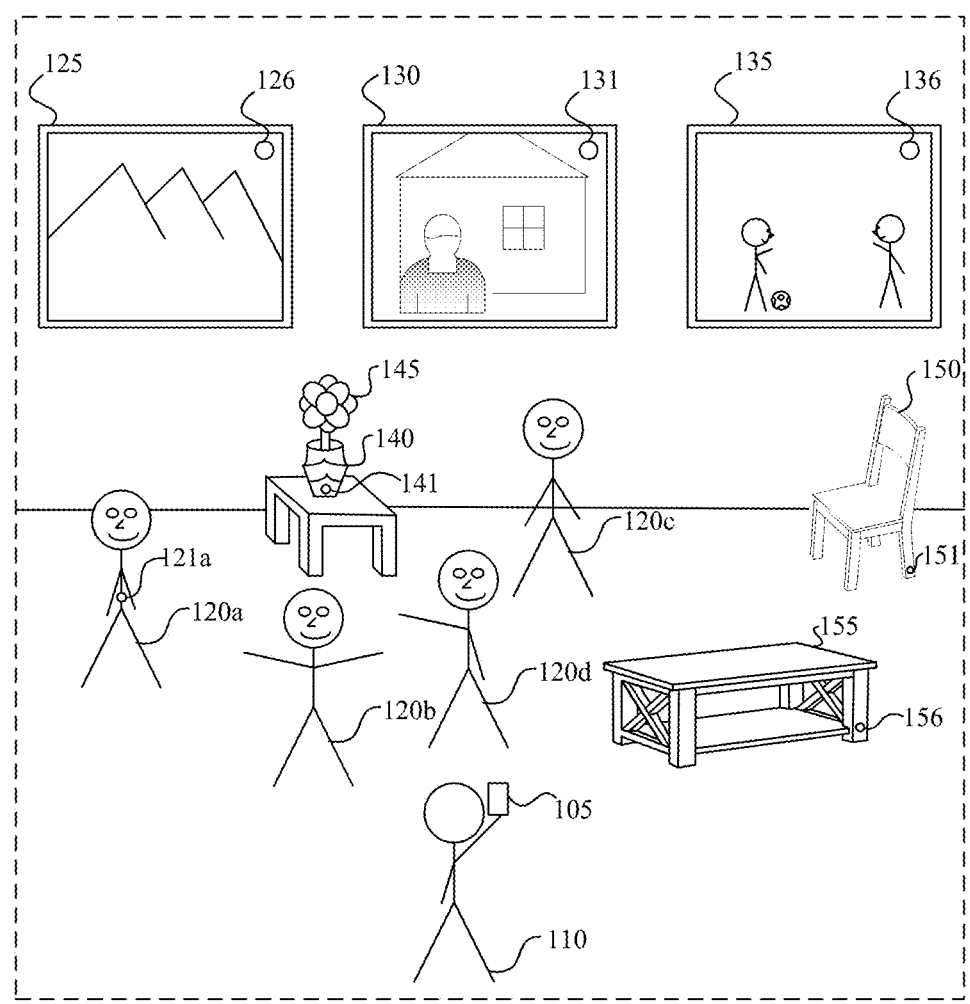
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 105 operated by user 110 in a physical environment 100. In this example, the physical environment 100 is a museum that includes people 120a-d, wall hangings 125, 130, 135, a vase 140 with flowers 150, a chair 150, and a table 155. The electronic device 105 includes one or more cameras, microphones, depth sensors, or other sensors that can be used to evaluate the physical environment 100 and the people and objects within it. In the example of FIG. 1, the wall hangings 125, 130, 135, a vase 140 with flowers 145, a chair 145, and a table 150 have been tagged with visual markers 126, 131, 136, 141, 146, 151, 156, respectively, which may display patterns, numbers, or other codes that can be evaluated to identify and/or augment the augments with which they are associated. The person 120a also has a visual marker 121a displayed on her employee name badge. In some implementations, a camera on device 105 captures one or more images of the physical environment and identifies objects and/or features based on evaluating the images (e.g., via machine learning-based semantic segmentation, etc.) and/or evaluating and/or decoding visual makers identified in the one or more images. In some implementations, visual markers are used to evaluate the context of a physical environment. In some implementations, visual markers are not used to evaluate the context of a physical environment.

Figure 2:
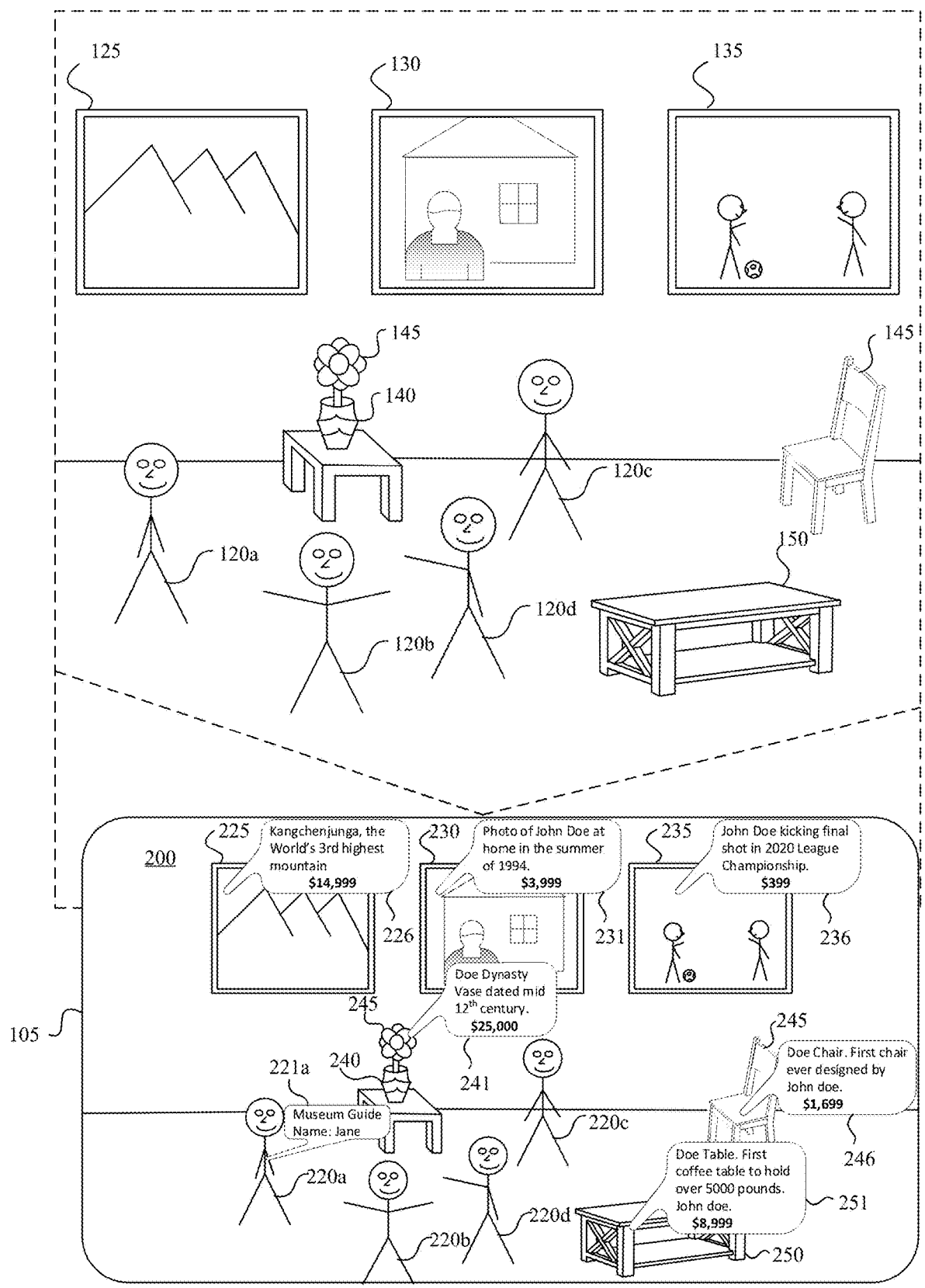
FIG. 2 illustrates the exemplary electronic device of FIG. 1 providing a view of the physical environment of FIG. 1 augmented with a variety of augmentations.

FIG. 2 illustrates the exemplary electronic device 105 of FIG. 1 providing a view 200 of the physical environment 100 augmented with a variety of augmentations. The electronic device 105 provides view 200 that includes depictions of the physical environment 100 from a viewer position, which in this example is determined based on the position of the electronic device 105 in the physical environment 100. Thus, as the user moves the electronic device 105 relative to the physical environment 100, the viewer position corresponding the electronic device 105 position is moved relative to the physical environment.

In this example, the view 200 includes a first wall hanging augmentation 226 adjacent to a depiction 225 of the first wall hanging 125, a second wall hanging augmentation 231 adjacent to a depiction 230 of the second wall hanging 130, a third wall hanging augmentation 226 adjacent to a depiction 235 of the third wall hanging 135, a vase augmentation 241 adjacent to depiction 240 of vase 140, a chair augmentation 246 adjacent to depiction 245 of chair 145, a coffee table augmentation 251 adjacent to depiction 250 of coffee table 150, and a guide augmentation 221a adjacent to depiction 220a of person 120a. While seven augmentations are illustrated in this example, the number, type, positioning, and appearance of the augmentations may vary in other implementations.

Some implementations disclosed herein determine to filter the augmentations 226, 231, 236, 241, 246, 251, and 221 to change the appearance of view 200 to improve the experience of user 110. In some implementations, the augmentations 226, 231, 236, 241, 246, 251, and 221 are filtered based on context. The context may be determined based on sensor data, detecting people, visual markers, or other objects based on sensor data, and/or evaluating sensor data and/or information derived from sensor data. The context may additionally or alternatively be based on information about the electronic device, user, and/or the current circumstances, e.g., time, location, etc. In some implementations, determining the context involves classifying the physical environment 100 as one of multiple classifications, determining the type of environment, determining whether the environment is visually noisy, determining whether the environment is audibly noisy, determining the amount of lighting of the environment, determining the number of people in the environment, determining the identities of people in the environment, determining the rate of change of objects in the environment, determining the number of people nearby relative to the user 110, determining the day of the week, the date, the time of day, determining a safety level of the environment, and/or determining whether the environment is of a type that requires few or no distractions due to safety considerations.

In the example of FIGS. 1 and 2, the physical environment is classified as a crowded environment based on images of the physical environment 100 captured by electronic device 110. The classification, in this example, is performed by a neural network trained to classify images of physical environment as either crowded or uncrowded. Such a neural network maybe trained, for example, using labeled images of a variety of crowded and uncrowded environments. Based on this context, e.g., the physical environment 100 being classified as crowded, the electronic device 110 determines to filter or modify the augmentations 226, 231, 236, 241, 246, 251, and 221 to change the appearance of view 200 to improve the experience of user 110. This also has the added benefit of saving power by reducing the number of augmentations to display.

Figure 3:
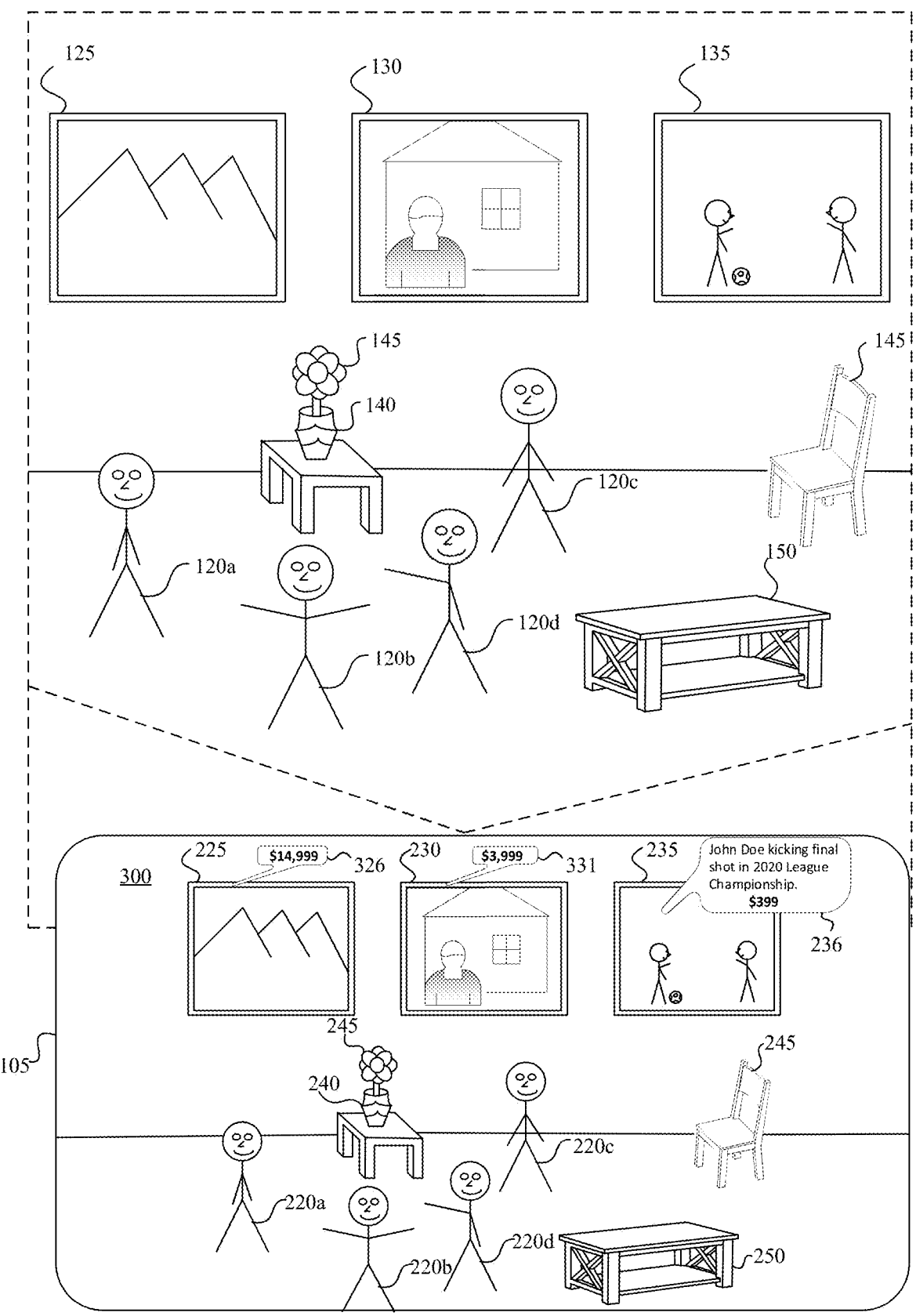
FIG. 3 illustrates the view of FIG. 2 with augmentations filtered according to implementations disclosed herein.

FIG. 3 illustrates the view of FIG. 2 with augmentations filtered according to implementations disclosed herein. Based on the context, the physical environment 100 being classified as crowded, the electronic device 110 determines to filter the augmentations to display fewer and different augmentations in view 300. In this example, the view 300 includes a first modified wall hanging augmentation 326 adjacent to the depiction 225 of the first wall hanging 125, a second modified wall hanging augmentation 331 adjacent to the depiction 230 of the second wall hanging 130, the third wall hanging augmentation 226 (same as the original) adjacent to the depiction 225 of the third wall hanging 125. While three augmentations are illustrated in this example, the number, type, positioning, and appearance of the filtered augmentations may vary in other implementations.

In the example of FIGS. 1-3, the electronic device 105 is illustrated as a single, hand-held device. The electronic device 105 may be a mobile phone, a tablet, a laptop, so forth. In some implementations, electronic device 105 is worn by a user. For example, electronic device 105 may be a watch, a head-mounted device (HMD), head-worn device (glasses), headphones, an ear mounted device, and so forth. In some implementations, functions of the device 105 are accomplished via two or more devices, for example a mobile device and base station or a head mounted display and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic device 105 may communicate with one another via wired or wireless communications.

According to some implementations, the electronic device 105 generates and presents an extended reality (XR) environment to one or more users. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 4:
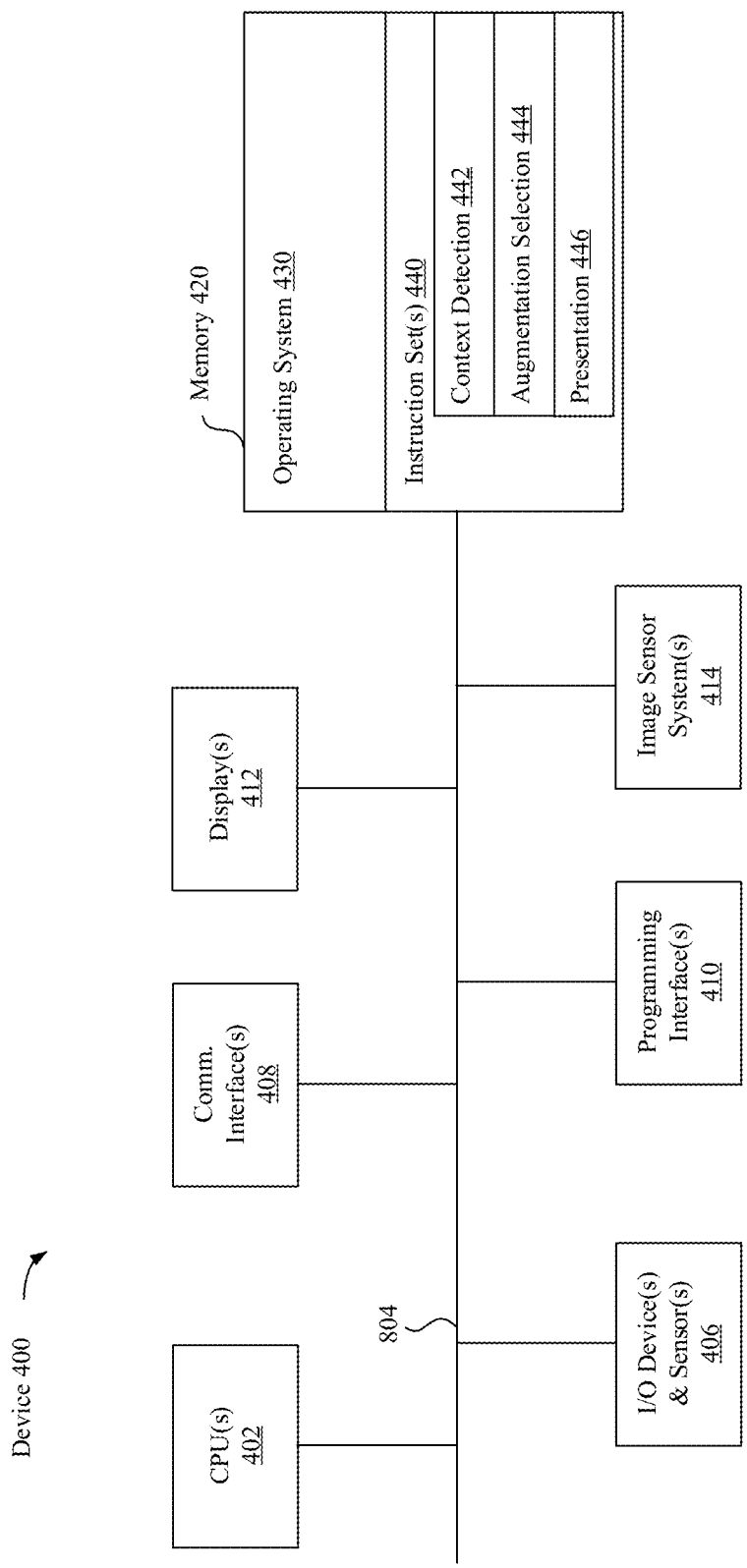
FIG. 4 is a block diagram of the electronic device of FIGS. 1-3 in accordance with some implementations.

FIG. 4 is a block diagram of electronic device 400. Device 400 illustrates an exemplary device configuration for electronic device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 410, one or more output device(s) 412, one or more interior and/or exterior facing image sensor systems 414, a memory 420, and one or more communication buses 304 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 412 include one or more displays configured to present a view of a 3D environment to the user. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 400 includes a single display. In another example, the device 400 includes a display for each eye of the user.

In some implementations, the one or more output device(s) 412 include one or more audio producing devices. In some implementations, the one or more output device(s) 412 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 412 may additionally or alternatively be configured to generate haptics.

In some implementations, the one or more image sensor systems 414 are configured to obtain image data that corresponds to at least a portion of the physical environment 100. For example, the one or more image sensor systems 414 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 414 further include illumination sources that emit light, such as a flash. In various implementations, the one or more image sensor systems 414 further include an on-camera image signal processor (ISP) configured to execute a plurality of processing operations on the image data.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium.

In some implementations, the memory 420 or the non-transitory computer readable storage medium of the memory 420 stores an optional operating system 430 and one or more instruction set(s) 440. The operating system 430 includes procedures for handling various basic system services and for performing hardware dependent tasks. In some implementations, the instruction set(s) 440 include executable software defined by binary information stored in the form of electrical charge. In some implementations, the instruction set(s) 440 are software that is executable by the one or more processing units 402 to carry out one or more of the techniques described herein.

The instruction set(s) 440 include a context detection instruction set 442, an augmentation selection instruction set 444, and a presentation instruction set 446. The instruction set(s) 440 may be embodied as a single software executable or multiple software executables.

The context detection instruction set 442 is executable by the processing unit(s) 402 to provide detect the context of a user's current experience, including, as examples the physical environment proximate the user, user attributes, and/or other information about the circumstances of the experience.

The augmentation selection instruction set 444 is executable by the processing unit(s) 402 to provide select or otherwise filter available augmentations for inclusion in a user experience, e.g., an XR environment being viewed by a user. In some implementations, the augmentation selection instruction set 444 is executed to determine which augmentations to include (e.g., selecting up to a predetermined number of augmentations based on criteria, e.g., proximity to user, topic, relevance to user, relevance to context, etc.) and/or how to display augments (e.g., size, shape, color, length of time displayed, sound characteristics, etc.).

The presentation instruction set 446 is executable by the processing unit(s) 402 to provide content, e.g., view and/or sounds of an XR environment. In some implementations, the presentation instruction set 446 is executed to determine how to present content based on a viewer position. In some implementations, augmentations are overlain upon a 2D view, e.g., video passthrough, of a physical environment. In some implementations, augmentations are assigned 3D positions corresponding to positions adjacent to corresponding objects in the physical environment.

Although the instruction set(s) 440 are shown as residing on a single device, it should be understood that in other implementations, any combination of the elements may be located in separate computing devices. Moreover, FIG. 4 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 5:
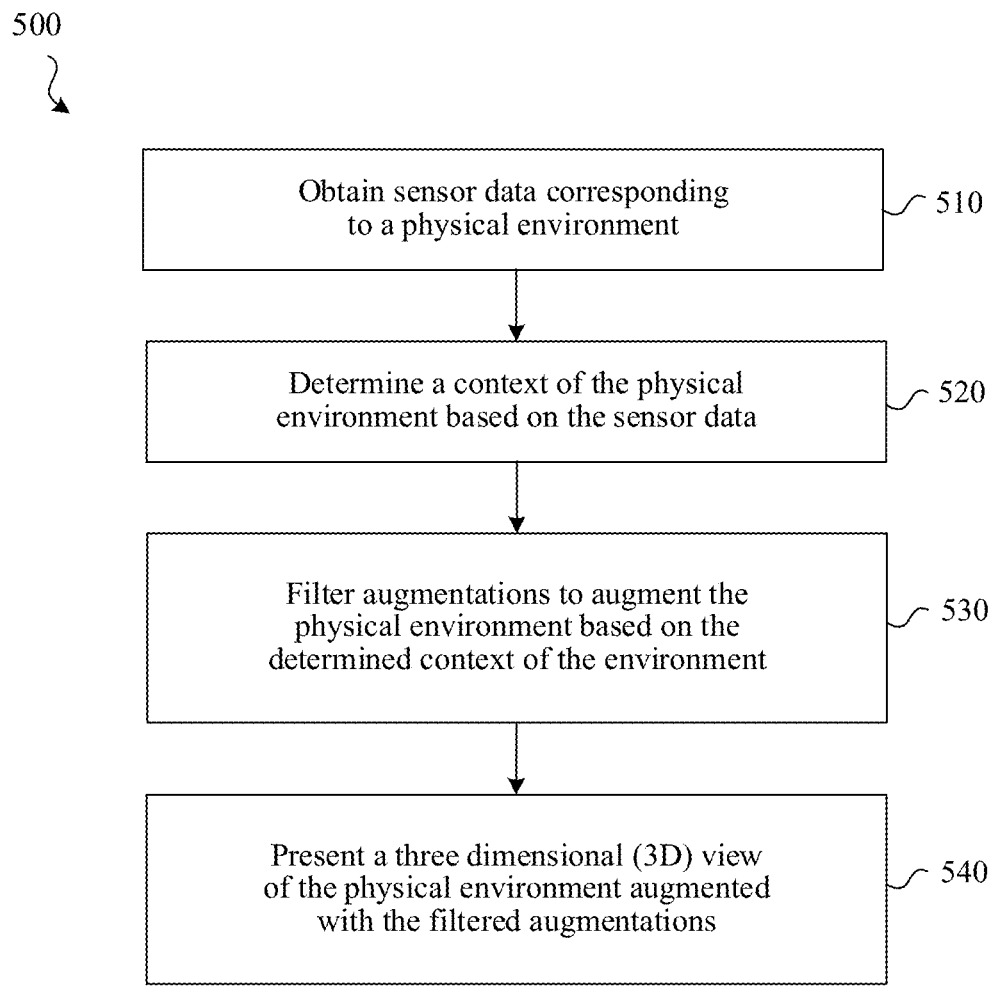
FIG. 5 is a flowchart illustrating a method for filtering augmentations in accordance with some implementations.

FIG. 5 is a flowchart illustrating an exemplary method 500. In some implementations, a device such as electronic device 105 or electronic device 300 performs the techniques of method 500 to filter augmentations. In some implementations, the techniques of method 500 are performed on a mobile device, desktop, laptop, HMD, ear-mounted device or server device. In some implementations, the method 500 is performed by processing logic, including hardware, firmware, software, or a combination thereof. In some implementations, the method 500 is performed on a processor executing code stored in a non-transitory computer-readable medium (e.g., a memory).

At block 510, the method 500 obtains sensor data corresponding to a physical environment. In some implementations, one or more light-intensity-based (e.g., RGB) cameras capture an image or sequence of images (e.g., video) of a physical environment proximate a user. In some implementations, one or more microphones capture sounds produced by objects proximate the user in the physical environment. In some implementations, one or more depth sensors generate data (e.g., depth maps) providing depth information (e.g., data identifying distances from the user's device to various portions of the environment). In some implementations, one or more ambient light sensors generate data about the lighting in the physical environment. In some implementations, one or more physiological sensors and/or biosensors obtain information about a user in the physical environment. Such user information may be indicative or otherwise correspond to a user's physical state, state of mind, intention, and/or interests, for example, providing information useful in determining with what a user wants to see and/or interact.

At block 520, the method 500 determines a context of the physical environment based on the sensor data. In some implementations, sensor data is evaluated algorithmically, for example, by applying one or more thresholds. Exemplary thresholds include, a threshold number of people in the environment, a threshold number of people within a predetermined distance of the user, whether at least one person is talking to the user, a threshold volume of audio in the environment, a threshold amount of movement in images of the environment, a threshold speed of movement of the user, etc.

In some implementations, machine learning is used to evaluate the context of a physical environment. Sensor data can be evaluated, for example, using machine learning techniques to semantically segment/label objects in the environment and/or to classify the environment or objects within. In some implementations, a machine learning model, such as a neural network, is trained and used to classify a physical environment into one of a plurality of different levels or types, e.g., levels of complexity, levels of augmentation propriety, type of activity (e.g., working, shopping, transportation, socializing, etc.).

The inputs to a process, algorithm, or machine learning model that determines context can include, but are not limited to, sensor data from the user's device(s) (e.g., mobile phone, HMD, watch, ear device, etc.), communications from other users' devices in the physical environment, location data of the physical environment, user input, user attributes, and/or data from others sources such as from security cameras, weather sensors, news sources, merchant websites, etc.

The context determined at block 520 can have a variety of suitable forms depending upon the implementation. In some implementations, the context identifies a type or types of the environment (e.g., shopping, work, business, residence, social, driving, tour, library, museum, school, etc.). In some implementations, the context identifies one or more characteristics of the environment (e.g., crowded, noisy, uncrowded, quiet, bright, dark, broad, narrow, wide, open-aired, sunny, shady, indoor, outdoor, flat ground, sloped ground, uneven ground, hilly, natural, city, urban, suburban, residential, high-rise, forest, desert, lake, river, beach, ocean, boat, train, car, etc.). In some implementations, the context identifies whether the environment is visually busy and/or audibly noisy. In some implementations the context includes the particular identities of people and the relationships of such people to the user. The identifies of such people may be identified, assuming appropriate permissions have been granted from such people, based on communications between device that enable location tracking. The context may identify whether a user is with spouse, with friends, with his/her kids, with work associates, etc. The context may identify the rate of change of one or more objects in the environment, e.g., identifying whether there are fast moving vehicles or other objects in the environment. The context may include the current day of the week, date, time of day, etc. The context may identify a danger level of the environment and/or whether the environment is of a type that requires few or no distractions due to safety considerations.

At block 530, the method filters augmentations to augment the physical environment based on the determined context of the environment. In some implementations this involves reducing the number of augmentations, reducing the amount of content within the augmentations, changing the way the augmentations are provided (e.g., size, color, opacity, brightness, length of display, display format (e.g., movie poster v. trailer), and/or selecting a subset of augmentations based on content/type/location (e.g., sports only, closest to center of field of view, etc.). Filtering may be based on a determined augmentation level, e.g., 1-10.

In some implementations, the filtering additionally or alternatively determined based on user input (e.g. turning a dial or identifying a user's current interest). For example, a user may turn a dial through a predetermined number of augmentations stages in which each stage increases the number and/or complexity of the augmentations included in the experience. Such user input may supplement and/or override automatic filtering determined based on context.

In some implementations, the filtering is based on user attributes (e.g., the user's schedule, the user's current activity or mood, the user's speed of movement, etc.). For example, augmentations may be filtered when the user is exercising to be easier to read (e.g., larger text) given an expectation that the user may be moving and/or distracted during exercise. In another example, based on determining that the user is rushed (e.g., given biometric data, calendar data, movement data, etc.), the number of augmentations may be limited and/or filtered to include only augmentations relevant to helping the user complete his or her current activity, e.g., showing only directions, shortcuts, etc.

In some implementations, filtering of augmentations provided by a device or system learns from user responses over time. For example, a system may learn that a user pays attention to/interacts with certain types of augmentations in certain contexts. The system can then use this preference/user information to filter augmentations in that context in the future to provide a more desirable user experience. Augmentations that are ignored by a user can be displayed less.

At block 540, the method 500 presents a three-dimensional (3D) view (e.g., an XR view) comprising the physical environment augmented with the filtered augmentations. The augmentations may include text, images, video, virtual objects, sounds, etc. and may be configured with attributes and/or at positions based on the context.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include physiological data to improve a user's experience of an electronic device. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
      obtaining sensor data corresponding to a physical environment;
      determining a context of the physical environment based on the sensor data, wherein determining the context comprises determining whether objects in the physical environment satisfy a movement criterion, wherein determining whether objects in the physical environment satisfy the movement criterion comprises identifying whether a rate of movement of the objects satisfies a fast threshold;
      filtering augmentations to augment the physical environment based on the determined context of the physical environment; and
      presenting a three-dimensional (3D) view comprising the physical environment augmented with the filtered augmentations.

2. The method of claim 1, wherein determining the context comprises determining, via a machine learning model, a complexity, type, or classification of the physical environment.

3. The method of claim 1, wherein determining the context comprises determining a number of people in the physical environment.

4. The method of claim 1, wherein determining the context comprises determining identities of people in the physical environment.

5. The method of claim 1, wherein determining the context comprises determining a day of the week, the date, or the time of day.

6. The method of claim 1, wherein determining the context comprises determining a level of attention appropriate for the physical environment.

7. The method of claim 6, wherein the filtering comprises selecting a subset of augmentations available for the physical environment based on the context.

8. The method of claim 7, wherein the augmentations available for the physical environment are identified based on identifying markings in images of the physical environment, wherein augmentations or positions for augmentations are identified based on the markings.

9. The method of claim 1, wherein the filtering comprises selecting a reduced amount of content to be included within the augmentations based on the context.

10. The method of claim 1, wherein the filtering comprises selecting characteristics for the augmentations based on the context.

11. The method of claim 1, wherein the filtering is based on user input, user attributes, user current activity, user current state, or user prior responses to augmentations.

12. The method of claim 1 further comprising determining an augmentation level on a numerical scale based on context, wherein the filtering is based on the augmentation level.

13. The method of claim 1, wherein determining whether objects in the physical environment satisfy the movement criterion comprises identifying whether the objects are moving fast.

14. The method of claim 1, wherein determining whether objects in the environment satisfy the movement criterion comprises identifying whether the objects are changing fast.

15. The method of claim 1, wherein determining the context comprises identifying that whether vehicles in the environment are fast moving.

16. The method of claim 1, wherein determining the context comprises identifying a danger level of the current environment.

17. The method of claim 1, wherein determining the context comprises identifying whether the current environment is of a type that requires few or no distractions due to safety considerations.

18. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
      obtaining sensor data corresponding to a physical environment;
      determining a context of the physical environment based on the sensor data, wherein determining the context comprises determining a rate of change of objects in the physical environment;
      filtering augmentations to augment the physical environment based on the determined context of the physical environment; and
      presenting a three-dimensional (3D) view comprising the physical environment augmented with the filtered augmentations.

19. The system of claim 18, wherein determining the context comprises determining:
   a complexity, type, or classification of the physical environment;
   a number of people in the physical environment; or
   identities of people in the physical environment.

20. The system of claim 18, wherein determining the context comprises determining a day of the week, the date, or the time of day.

21. The system of claim 18, wherein the filtering comprises selecting a subset of augmentations available for the physical environment based on the context, wherein the augmentations available for the physical environment are identified based on identifying markings in images of the physical environment, wherein augmentations or positions for augmentations are identified based on the markings.

22. The system of claim 18, wherein the filtering comprises selecting:
   selecting a reduced amount of content to be included within the augmentations based on the context; or
   selecting characteristics for the augmentations based on the context.

23. A non-transitory computer-readable storage medium storing program instructions executable via one or more processors to perform operations comprising:
   obtaining sensor data corresponding to a physical environment;
   determining a context of the physical environment based on the sensor data, wherein determining the context comprises determining whether objects in the physical environment satisfy a movement criterion, wherein determining whether objects in the physical environment satisfy the movement criterion comprises identifying whether a rate of movement of the objects satisfies a fast threshold;

filtering augmentations to augment the physical environment based on the determined context of the physical environment; and presenting a three-dimensional (3D) view comprising the physical environment augmented with the filtered augmentations.

24. The non-transitory computer-readable storage medium of claim 19, wherein determining the context comprises determining:

a complexity, type, or classification of the physical environment;

a number of people in the physical environment; or identities of people in the physical environment.

* * * * *